Sept. 2, 1941.    W. L. KAUFFMAN, 2D    2,254,486
UNIVERSAL COUPLING
Filed Oct. 7, 1938

Walter L. Kauffman II
INVENTOR.

BY
ATTORNEYS.

Patented Sept. 2, 1941

2,254,486

UNITED STATES PATENT OFFICE 2,254,486

UNIVERSAL COUPLING

Walter L. Kauffman, II, Erie, Pa., assignor to Lovell Manufacturing Company, Erie, Pa., a corporation of Pennsylvania Application October 7, 1938, Serial No. 233,836

6 Claims. (Cl. 64—6)

This invention relates to universal couplings. It is a coupling used with different types of mechanism, particularly that in which the load is not great, such as a coupling used between the driving shaft and driven shaft of a wringer. These shafts are not only off-set, but there may be a variation in the angularity and the coupling is designed to take care of either of these misalinements. Features and details of the invention will appear from the specification and claims.

Figure 1:
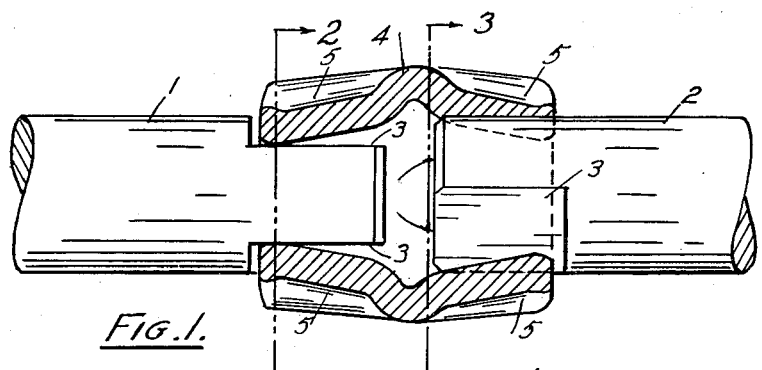
Figure 3:
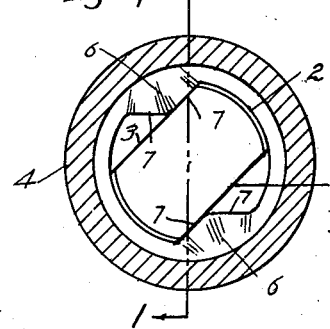

A preferred embodiment of the invention is illustrated in the accompanying drawing as follows:

Fig. 1 shows a central section through the coupling on the line 1—1 in Fig. 3.

Figure 2:
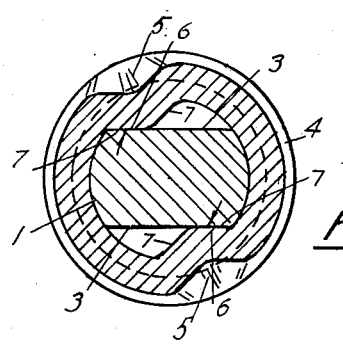

Fig. 2 a cross section on the line 2—2 in Fig. 1.

Fig. 3 a section on the line 3—3 in Fig. 1.

Figure 4:
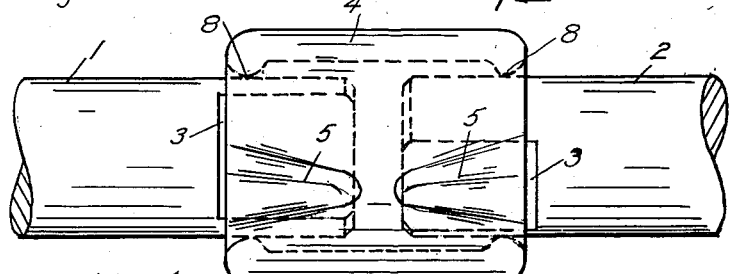

Fig. 4 an elevation with the shafts in alinement.

Figure 5:
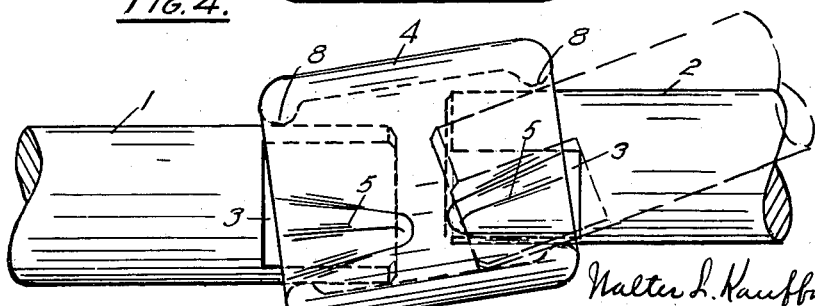

Fig. 5 an elevation with the parts off-set.

1 and 2 mark the driving and driven shafts respectively. Each of these shafts has flats 3 on opposite sides extending inwardly from the ends of the shafts. These flats form driving shoulders for the shafts. A coupling tube 4 is indented, or depressed at its ends forming a V-shaped depression 5 with V-shaped shoulders and a shoulder 6, the shoulder 6 being V-shaped forming driving faces 7, 7. The driving faces 7 are adapted to engage the faces 3, one face 7 being in engagement with a driving movement in one direction and the opposite face being in engagement with a driving movement in the reverse direction.

Preferably the flats on the two shafts when in driving relation are arranged at 45° to each other as this permits the same driving relation in both forward movement and reverse. In forming the tube 4 a pipe having an inner diameter slightly larger than that of the shafts is depressed at the ends forming V-shaped depressions, these depressions forming corresponding inner shoulders opposite the depressions. The depressions extend inwardly to the greatest extent at the ends of the tube so that the opening flares from the end inwardly. This permits of freedom angularly and an engagement largely at the end of the tube. Ribs 8 are formed between the shoulders, the ribs giving added freedom for angular movement between the shafts and the coupling tube and at the same time holding the coupling tube practically centered with the shaft. This mechanism makes a very simple coupling for manufacture, one giving ample wearing surfaces for use and one that may be readily assembled.

What I claim as new is:

1. In a universal coupling, the combination of a member having a flat on at least one side, a coupling tube overlapping the end of the member, said tube having its walls of uniform thickness, and a depression extending axially from its end toward the center, the tube having a rib corresponding to the depression within the opening of the tube, a side wall of the rib forming a driving surface engaging the flat of the member.

2. In a universal coupling, the combination of a member having a flat on at least one side, a coupling tube overlapping the end of the member, said tube having its walls of uniform thickness, and a depression extending axially from its end toward the center, the tube having a rib corresponding to the depression within the opening of the tube, a side wall of the rib forming a driving surface engaging the flat of the member, the depression being deeper at the end of the tube than toward the center and the corresponding rib being larger toward the end than toward the center.

3. In a universal coupling, the combination of a driving and driven member, each having a flat on at least one side, a coupling tube overlapping the ends of the members, said tube having its walls of substantially uniform thickness, and depressions extending axially from its ends toward the center, the tube having ribs corresponding to the depressions within the opening of the tube, a side wall of each rib forming a driving surface engaging a flat of the member.

4. In a universal coupling, the combination of a driving and driven member, each having a flat on at least one side, a coupling tube overlapping the ends of the members, said tube having its walls of substantially uniform thickness, and depressions extending axially from its ends toward the center, the tube having ribs corresponding to the depressions within the opening of the tube, a side wall of each rib forming a driving surface engaging a flat of the member, the depressions being deeper and the ribs larger at the ends than toward the center.

5. In a universal coupling, the combination of a member having a flat on at least one side, a coupling tube overlapping the end of the member, said tube having its walls of uniform thickness, and a V-shaped depression extending axially from its end towards the center, the tube having a V-shaped rib corresponding to the depression within the opening of the tube, a side wall of the rib forming a driving surface engaging the flat of the member, one side wall of the rib engaging the flat when the members are driven in one direction and the opposite side wall engaging the flat when the members are driven in the opposite direction.

6. In a universal coupling, the combination of a member having a flat on at least one side, a coupling tube overlapping the end of the member, said tube having its walls of uniform thickness, and a depression extending axially from its end toward the center, the tube having a rib corresponding to the depression within the opening of the tube, a side wall of the rib forming a driving surface engaging the flat of the member, the end of the tube between the ribs having circumferential portions adapted to engage the circumferential portions extending from the edges of the flat.

WALTER L. KAUFFMAN, II.